United States Patent
Philippi

(10) Patent No.: US 10,444,068 B2
(45) Date of Patent: Oct. 15, 2019

(54) CALIBRATION DEVICE AND CALIBRATION METHOD FOR AN APPARATUS FOR PRODUCING AN OBJECT IN LAYERS

(71) Applicant: EOS GmbH Electro Optical Systems, Krailling (DE)

(72) Inventor: Jochen Philippi, Grafelfing (DE)

(73) Assignee: EOS GMBH ELECTRO OPTICAL SYSTEMS, Krailing, OT (DE)

( * ) Notice: Subject to any disclaimer, the term of this patent is extended or adjusted under 35 U.S.C. 154(b) by 482 days.

(21) Appl. No.: 14/903,660

(22) PCT Filed: Jun. 27, 2014

(86) PCT No.: PCT/EP2014/063779
§ 371 (c)(1),
(2) Date: Jan. 8, 2016

(87) PCT Pub. No.: WO2015/003937
PCT Pub. Date: Jan. 15, 2015

(65) Prior Publication Data
US 2016/0144571 A1 May 26, 2016

(30) Foreign Application Priority Data
Jul. 10, 2013 (DE) .......................... 10 2013 213 547

(51) Int. Cl.
*G01J 1/44* (2006.01)
*G01J 1/42* (2006.01)
(Continued)

(52) U.S. Cl.
CPC .............. *G01J 1/44* (2013.01); *B29C 64/135* (2017.08); *B29C 64/153* (2017.08);
(Continued)

(58) Field of Classification Search
CPC . B29C 67/0088; B29C 64/153; B29C 64/386; B29C 64/135
See application file for complete search history.

(56) References Cited

U.S. PATENT DOCUMENTS 5,058,988 A   10/1991   Spence
5,133,987 A    7/1992   Spence et al.
(Continued)

FOREIGN PATENT DOCUMENTS

DE   19818469 A1   10/1998
DE   19918613 A1    4/1999
(Continued)

OTHER PUBLICATIONS

International Preliminary Report on Patentability and Written Opinion dated Jan. 12, 2016; 7 pages.

*Primary Examiner* — Jacob T Minskey
*Assistant Examiner* — Melody Tsui
(74) *Attorney, Agent, or Firm* — Seyfarth Shaw LLP

(57) ABSTRACT

A calibration device (30) for an apparatus (1) for layerwise production of a three-dimensional object (2) by layerwise solidification of building material (10) at the locations corresponding to the cross section of the object to be produced in the respective layer by means of at least two energy beams (14a, 14b) includes a housing (31) and a sensor (32) which is arranged in the housing. The sensor serves to receive the at least two energy beams and to output an output signal as a function of the intensity of the energy beams. The housing has at least two through-openings (34a, 34b) for transmitting the at least two energy beams, which are arranged so that their central axes intersect on a surface of the sensor.

7 Claims, 3 Drawing Sheets

(51) Int. Cl.
*B29C 64/135* (2017.01)
*B29C 64/153* (2017.01)
*B29C 64/386* (2017.01)
*B29K 105/00* (2006.01)

(52) U.S. Cl.
CPC .......... *B29C 64/386* (2017.08); *G01J 1/4257* (2013.01); *B29K 2105/251* (2013.01)

(56) References Cited

U.S. PATENT DOCUMENTS

| | | | |
|---|---|---|---|
| 5,393,482 A * | 2/1995 | Benda | B22F 3/1055 419/1 |
| 5,753,171 A * | 5/1998 | Serbin | B29C 35/0288 250/492.1 |
| 5,985,204 A | 11/1999 | Otsuka | |
| 6,483,596 B1 | 11/2002 | Philippi et al. | |
| 2008/0131104 A1 | 6/2008 | Philippi | |
| 2010/0264302 A1 | 10/2010 | Philippi | |

FOREIGN PATENT DOCUMENTS

| | | |
|---|---|---|
| DE | 102005024790 A1 | 12/2006 |
| DE | 102009016585 A1 | 10/2010 |
| JP | 2009006509 A | 1/2009 |

* cited by examiner

CALIBRATION DEVICE AND CALIBRATION METHOD FOR AN APPARATUS FOR PRODUCING AN OBJECT IN LAYERS

The present invention relates to a calibration device and to a calibration method for an apparatus for layerwise production of a three-dimensional object by layerwise solidification of building material at the locations corresponding to the cross section of the object to be produced in the respective layer by means of introducing energy.

An apparatus for producing a three-dimensional object by means of a method, known under the name of "Selective laser sintering", is described in DE 10 2005 024 790 A1.

DE 198 18 469 discloses an apparatus which includes two separate laser sources and radiation apparatuses for the solidification of building material. In addition, applicant themselves have brought onto the market for years laser sintering apparatuses which are equipped with a dual head system.

A method for calibrating an apparatus for producing a three-dimensional object by means of a calibration plate which includes a photosensitive film is described in DE 199 18 613 A1. In this case, the laser exposes alignment crosses on the photosensitive film which are subsequently compared with reference crosses mounted on the calibration plate. This method is complex and designed only for one scanner. However, the method must be carried out before the actual construction process.

The object of the present invention is to provide a calibration device and a calibration method with the aid of which an apparatus for producing a three-dimensional object which uses more than one radiation source can be calibrated and, consequently, the production accuracy of the objects can be improved.

The object is achieved by means of a calibration device as claimed in claim 1, a calibration method as claimed in claim 6, a method for producing a three-dimensional object as claimed in claim 8 and an apparatus for producing a three-dimensional object as claimed in claim 10. Developments of the invention are specified in the respective subclaims.

The calibration device enables a calibration method in the case of which the positions of the individual laser beams at which the sensor of the calibration device supplies the maximum output signal, are determined iteratively. By comparing said positions with one another and/or with the corresponding desired positions, it is possible to detect and correct deviations. In this way, the apparatus is calibrated and thus the production accuracy of the objects is improved.

Further features and advantages of the invention follow from the description of exemplary embodiments with the aid of the attached drawings, in which.

Figure 1:
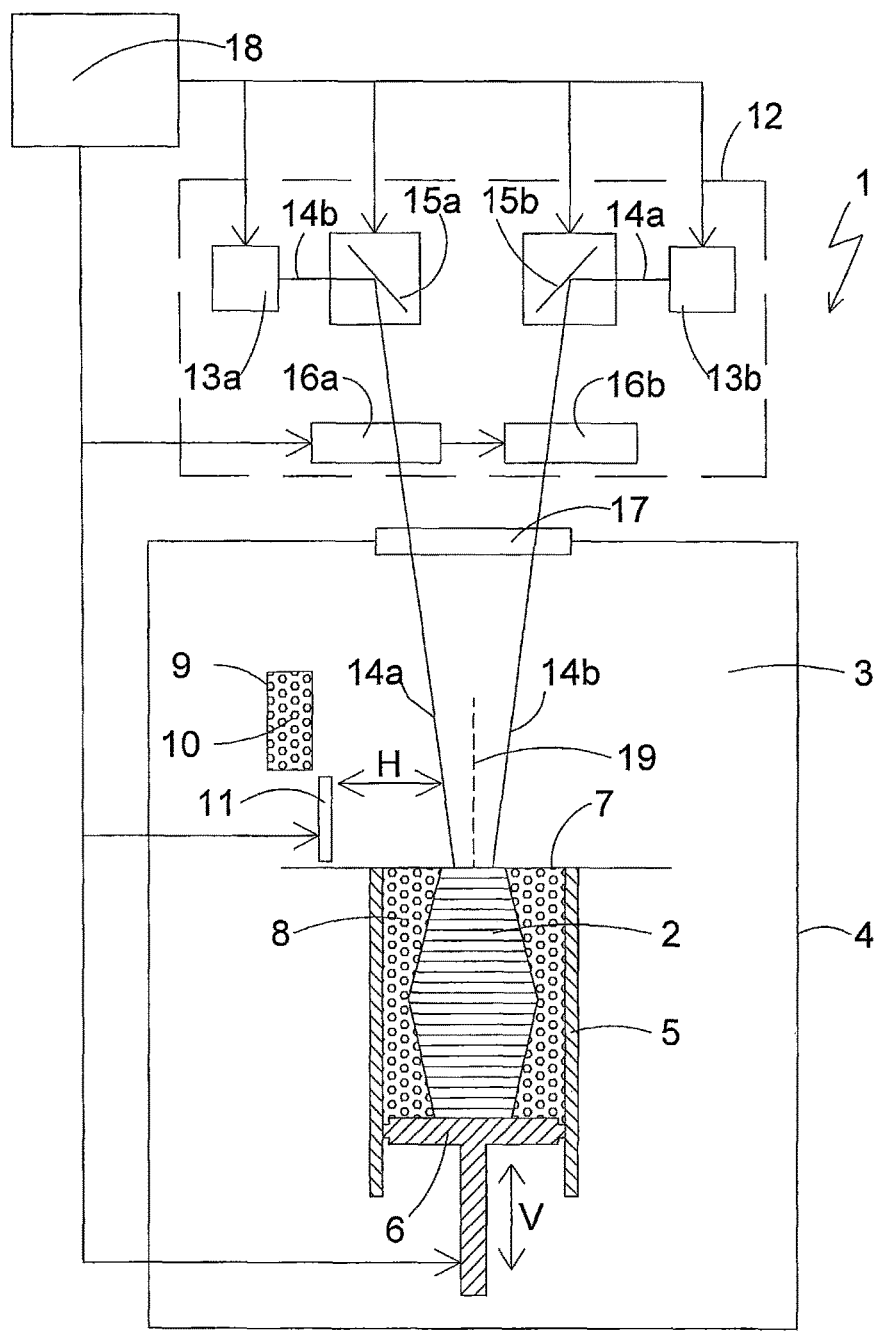
FIG. 1 is a partially sectional schematic view of an exemplary embodiment of an apparatus for layerwise production of a three-dimensional object, which is suitable for carrying out the present invention.

Described below with reference to FIG. 1 is an exemplary embodiment of an apparatus which is suitable for carrying out the inventive method. The apparatus illustrated in FIG. 1 is a laser sintering or laser melting apparatus 1. This contains a process chamber 3 with a chamber wall 4 for constructing the object 2.

Arranged in the process chamber 3 is a container 5 open at the top with a vertically (V) movable support 6, on which the object 2 is constructed. In FIG. 1, the object 2 to be formed is illustrated below a working plane 7 in an intermediate state with a plurality of solidified layers, surrounded by building material 8 remaining unsolidified. Also arranged in the process chamber 3 are a reservoir 9 for powdery building material 10 which can be solidified by electromagnetic radiation, and a horizontally (H) movable coater 11 for applying the building material 10 to the working plane 7.

The laser sintering apparatus 1 further contains an irradiation apparatus 12 for solidifying the applied powdery layer. The irradiation apparatus includes two lasers 13a, 13b which each generate a laser beam 14a, 14b which is deflected by a deflection apparatus 15a, 15b and is focused onto a predetermined point of the working plane 7 by a focusing apparatus 16a, 16b via a coupling window 17 in the wall of the process chamber 3.

Finally, the laser sintering apparatus 1 includes a control unit 18 via which the individual components of the apparatus are controlled in a coordinated way to carry out the building process. The control unit can include a CPU under the control of a computer program.

In operation, the support 6 is firstly lowered by the desired layer thickness, after which the coater 11 is used to apply a layer of the powdery building material 10. Subsequently, the cross section of the object to be produced is scanned by the two laser beams 14a, 14b so that the powdery building material 10 is solidified at these locations. These steps are repeated until the object 2 is completed and can be removed from the building space 3. Instead of one object, it is also possible to produce a plurality of objects simultaneously. Here, for example, one laser beam can solidify a portion of the objects, and the other laser beam the other portion of the objects.

By using two separate laser beams 14a, 14b and deflection apparatuses 15a, 15b, it is possible to irradiate a larger region of the working plane 7 than if so with only one radiation source. In the case of an unchanged working area, the production time of the object or of the objects 2 can be reduced by the fact that two different areas are irradiated simultaneously.

The irradiation apparatus 12 can be constructed so that both laser beams 14a, 14b can scan the same area of the working plane 7. However, the two laser beams 14a, 14b preferably have working areas differing from one another (separated from one another in FIG. 1 by the central plane 19). The working areas of the two laser beams 14a, 14b preferably overlap one another so that object sections in the overlapping area can optionally be scanned with one or other of the laser beams 14a, 14b.

In order to ensure that when the same target point is input the two laser beams are focused onto the same point in the working plane via the controller, the irradiation apparatus 12 must be calibrated.

Figure 2:
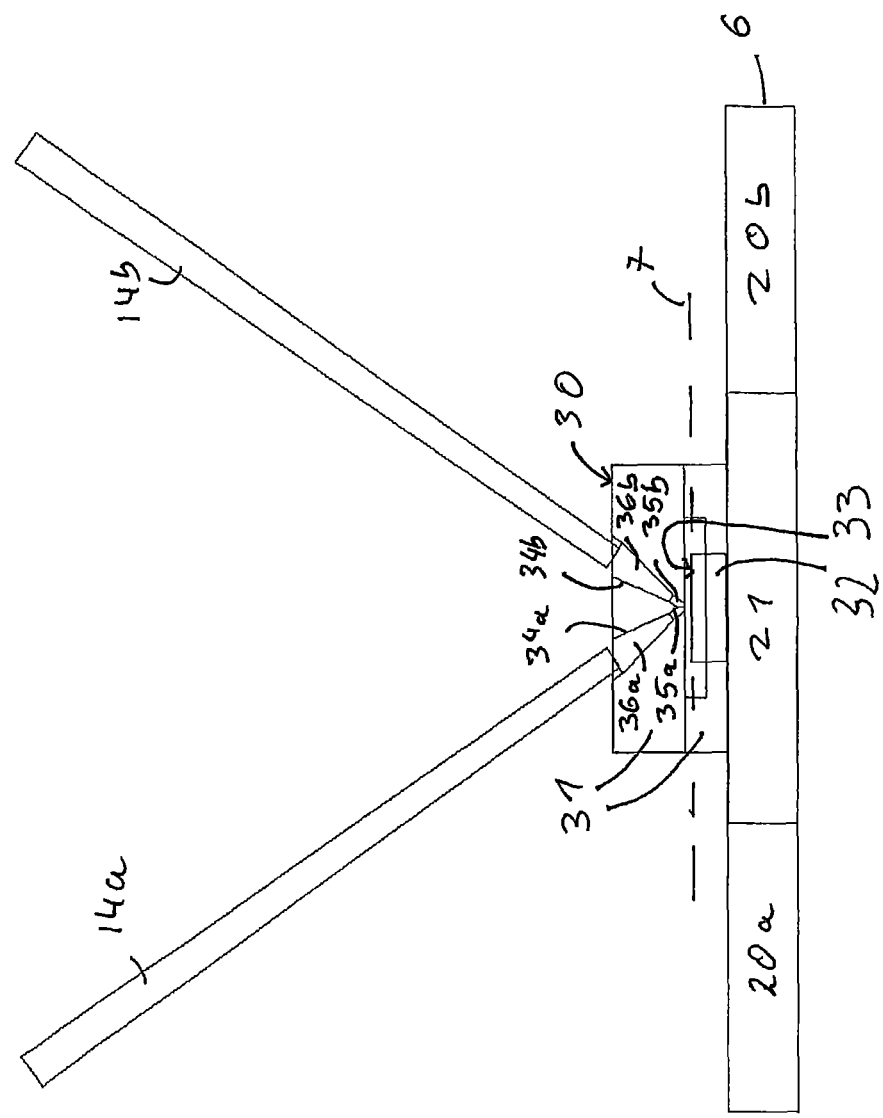
FIG. 2 is an enlarged partial sectional view of a support, shown in FIG. 1, on which a calibration device in accordance with a first embodiment of the present invention is arranged.

FIG. 2 shows in section a section of the support 6 shown in FIG. 1 on the surface of which a calibration device 30 in accordance with a first embodiment of the present invention is arranged. Indicated in the support schematically are two working areas 20a, 20b which can respectively be scanned by one of the two laser beams 14a, 14b, and an overlapping area 21 which can be scanned by the two laser beams 14a, 14b. As a rule, the lasers are incident obliquely on the working plane 7 in the overlapping area 21.

The calibration device 30 includes a housing 31 which can be of one-piece or multipartite design, and a sensor 32 arranged in the housing 31. In the present embodiment, the housing is formed from a metal block which has a cutout, and the sensor is inserted into said cutout. The support is set so that the surface 33 of the sensor 32 is situated in the working plane 7 in which the laser beams 14a, 14b are focused. The support 6 is set at an interval deeper than the working plane 7, which corresponds to the height of the surface of the sensor above the base surface of the calibration device.

As sensor, it is possible to use any sensor sensitive to the laser wavelength, for example optoelectronic sensors which convert the incident light into an electrical signal. Thus, for example, a photodetector in the form of a semiconductor detector made of germanium or silicon can be used. However, it is also possible to use a thermoelectric pile (thermopile) sensor, preferably an atomic layer thermopile (ALTP) sensor which measures the laser power via the heat resulting from the incidence of the laser beam. Very short response times can be implemented with such atomic layer thermopile sensors.

Formed obliquely in the housing 31 of the calibration device 30 are two through-holes 34a, 34b which are provided to transmit the two laser beams 14a, 14b. In this case, the angle to the vertical is preferably less than 60°, furthermore preferably less than 45°. The lower section of the through-holes 34a, 34b is formed as a very fine hole (pinhole) 35a, 35b, and the upper section is formed as a conical section 36a, 36b whose diameter increases upwardly. The holes 35a, 35b are arranged so that their central axes intersect on the surface 33 of the optical sensor 32.

In operation, said calibration device 30 is placed on a measuring point which is situated within the overlapping area 21. The control unit then firstly controls one of the two laser beams 14a, 14b so that it incides onto the measuring point. In this case, the laser beam 14a, 14b passes through the corresponding through-opening 34a, 34b and is incident on the surface of the sensor 32. The sensor detects the incident light and emits a signal corresponding to the measured light intensity.

The position of the laser beam 14a, 14b is now set iteratively so that the signal supplied by the sensor 32 reaches a maximum. When the laser beam 14a, 14b moves over the pinhole 35a, 35b of the through-opening 34a, 34b, the sensor 32 supplies a signal with a bell-shaped profile. The maximum of this signal corresponds to the maximum passage of the laser beam 14a, 14b through the pinhole 35a, 35b.

In this case, the accuracy of the measurement is determined, inter alia, by the diameter of the pinhole. Said diameter is preferably selected so that it is approximately equal to the diameter of the laser beam at the measuring point. If the diameter of the pinhole is too large, the bell-shaped profile exhibits not a pronounced maximum, but a wide plateau, and this reduces the accuracy with which the position is determined. If the diameter of the pinhole is too small, the received laser power drops, and in this case, as well, the bell-shaped profile exhibits no pronounced maximum, and this likewise reduces the accuracy.

On the other hand, the conical section 36a, 36b ensures that the laser beam need not incide at a specific incidence angle, but that a specific angular range is permissible. However, it also prevents interfering reflections in the event of a wrongly positioned laser beam 14a, 14b. However, it does not have a focusing effect on the laser beam.

The output signal of the sensor 32 is preferably fed to the control device 18 so that the iterative setting can be performed automatically by the control device 18 onto the position which corresponds to a maximum irradiation of the sensor and thus to a maximum output signal of the sensor.

Subsequently, the same operation is carried out for the second laser beam. The actual positions at which the maximum output signal of the sensor is reached are compared with one another and/or with the respective desired positions. Actual and desired positions relate in this case to the representations of the point of incidence of the laser beam on the working plane in the coordinate system of the laser sintering apparatus. Calculated from the deviations is a correction value for controlling the laser beams which is taken into account in the subsequent production of the three-dimensional object. The determination of the deviation and the correction are preferably also carried out automatically by the controller 18.

Since the overlapping area of two laser beams extends in the form of an elongated strip in the direction situated in FIG. 2 perpendicular to the plane of the drawing, it is advantageous to carry out the calibration at least at two positions at opposite ends of the strip. This can be achieved by carrying out two measurements one after another at different points with the aid of the same calibration device which is placed between the two measurements, or by carrying out the two measurements in parallel with two calibration devices which are arranged at different points in the overlapping area. In addition to a lateral offset, it is also possible thereby, for example, to detect and correct scaling errors and rotational errors.

Such a measurement at two different points of the overlapping area can, for example, be obtained by using a bar equipped with two sensors, the two sensors being positioned respectively at one end of the bar. Said bar is then positioned at a predefined position in the overlapping area in the construction field.

This form of calibration is more accurate and simpler to carry out than the calibration by means of a camera, as described in the prior art.

Figure 3:
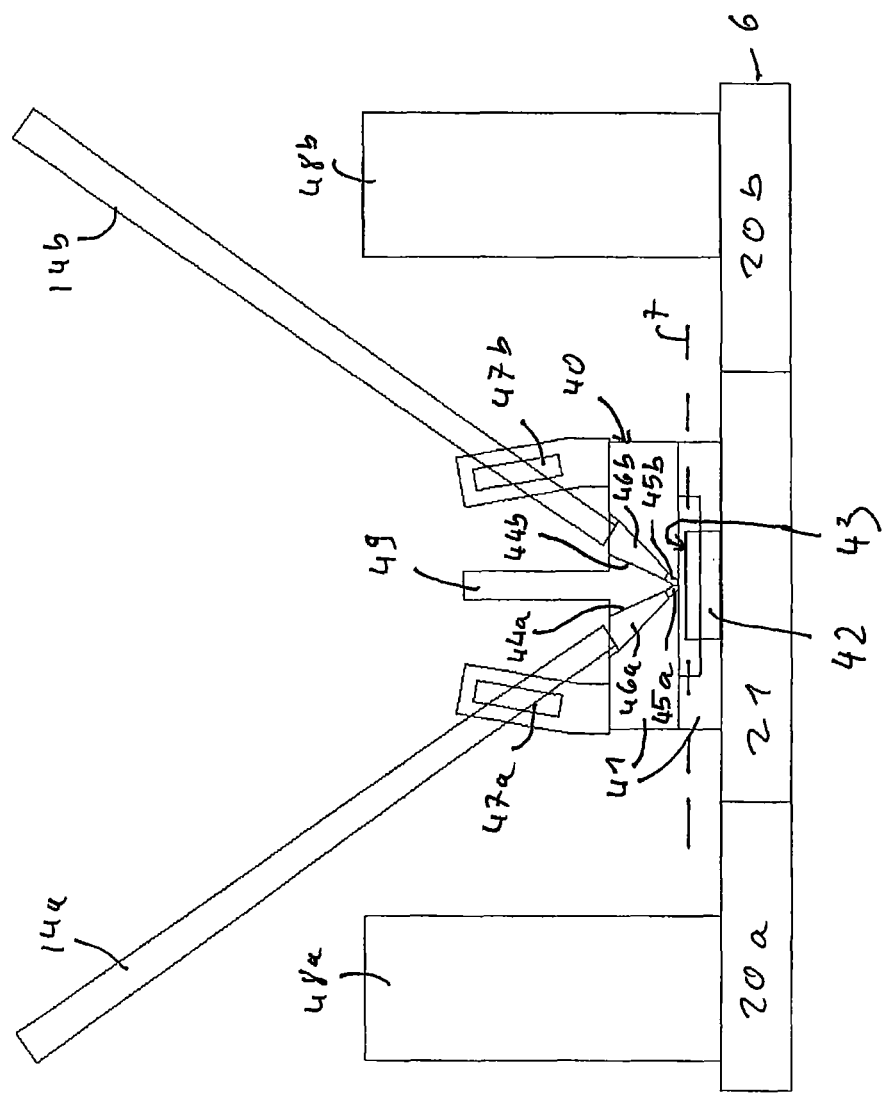
FIG. 3 is an enlarged partial sectional view of a support, shown in FIG. 1, on which a calibration device in accordance with a second embodiment of the present invention is arranged.

FIG. 3 shows in section a section of the support 6 shown in FIG. 1, on whose surface a calibration device 40 in accordance with a second embodiment of the present invention is arranged.

The calibration device 40 is constructed similarly to the calibration device 30 and, as does the latter, includes a one-piece or multipartite housing 41 and a sensor 42. The housing 41 includes the two through-holes 44a, 44b with the pinhole 45a, 45b and the conical section 46a, 46b. Said elements correspond to those of the first embodiment and are not described here once again.

In addition, the calibration device 40 includes two beam splitters 47a, 47b which are respectively arranged in the central axis of the through-holes 44a, 44b, two radiation absorbers 48a, 48b which are arranged on either side of the beam splitters 47a, 47b, and a partition wall 49.

The calibration operation is performed exactly as in the first embodiment. The additionally provided beam splitters 47a, 47b have the effect that the light intensity incident on the sensor is reduced by comparison with the first embodiment. As a result, it is possible in the case of larger laser powers to prevent the sensor from being overloaded or even destroyed, without the laser power having to be specially down-regulated for the calibration, which could possibly also change the beam shape.

The beam absorber 48a, 48b absorbs the radiation deflected via the beam splitters 47a, 47b from the optical path, and the partition wall 49 prevents radiation passing from one beam splitter to the other.

The laser used can be any laser suitable for solidifying the powdery building material, including gas lasers such as, for example, $CO_2$ lasers, solid state lasers such as, for example, NdYAG lasers, semiconductor lasers, fiber lasers etc.

Although the present invention has been described with the aid of a laser sintering or laser melting apparatus, it is not limited to laser sintering or laser melting. Thus, for example, instead of a laser it is possible to use a light-emitting diode (LED), an LED array or any other energy source or beam source which is suitable for solidifying the powdery building material.

In particular, the energy input is not limited to visible light, but can also be performed by invisible infrared light or ultraviolet radiation. The sensor is then to be selected in accordance with the energy source used.

The two energy beams need not come from two separate energy sources; they can also be obtained from one energy source by beam splitting and be deflected by separate deflection apparatuses.

The number of the energy beams is not limited to two; it is also possible to use more than two energy beams. Thus, for example, in the case of four-headed machines, the individual working areas form four adjacent squares which mutually overlap one another. In this case, the above described calibration devices can be used to carry out a calibration operation in an overlapping area of two energy beams. By providing four through-openings in the calibration device, it is, however, also possible to carry out a calibration operation in the overlapping area of all four squares for the four energy beams at the same time. Any other desired numbers of energy beams and/or through-openings in the calibration device are likewise possible.

The upper section 36a, 36b of the through-openings 34a, 34b can also be of a design other than conical. It can be extended upward in any profile or else be formed cylindrically with a larger diameter than the pinhole.

Instead of a sensor, which determines only the total intensity of the radiation, it is also possible to use sensors which can carry out a local determination of the incident beam. Thus, for example, when use is made of a two- or four-quadrant sensor given at which differential currents between adjacent active areas are detected, it is possible to supply more accurate local information because then the quadrant separating edge determines the local resolution. An accurate measurement of the position is thereby ensured even when the diameter of the laser beam is smaller than that of the pinhole. Such a residual current measurement is also possible in the case of an atomic layer thermopile sensor.

The calibration method is preferably performed before the start of the building operation. However, it can also be repeated during the building operation. In this case, the calibration device is not placed directly on the support but on the last solidified layer of the object to be produced.

Whilst the calibration device has been described in the above embodiments as a single object which can be placed on the support or a solidified material layer, the calibration device may also be included in the apparatus for producing a three-dimensional object. It can then, for example, be fitted on a movable arm which, for the purpose of calibration, moves to the desired location and positions the sensor so that its surface is situated in the working plane.

However, it is also possible to carry out a calibration when the sensor is not positioned in the working plane. Within the known offset height, the measured actual values of the beam position in another plane can be used to derive the actual values relevant to the working plane. This corresponds to a pure geometric conversion. This is relevant, in particular, for the mounting of the sensor system on a movable arm or for measurement during the building process.

The invention claimed is:

1. An apparatus for producing a three-dimensional object by layerwise solidification of building material at locations corresponding to a cross section of the object to be produced in respective layers by introducing energy, the apparatus comprising:
   a support on which the object is constructed;
   a coater that applies a layer of the building material to the support or to one of the respective layers of building material that was previously at least selectively solidified;
   at least one energy source that generates at least two energy beams;
   at least two scanning apparatuses that scan locations, corresponding to the cross section of the object to be produced, of the applied layer of the building material with the at least two energy beams for selectively solidifying the building material; and
   a calibration device including:
      a housing; and
      a sensor arranged in the housing, for receiving the at least two energy beams and outputting an output signal as a function of the intensity of the energy beams, the housing having at least two through-openings for transmitting the at least two energy beams, which are arranged so that their central axes intersect on a surface of the sensor.

2. An apparatus for producing a three-dimensional object by layerwise solidification of building material at locations corresponding to a cross section of the object to be produced in respective layers by introducing energy, the apparatus comprising:
   a support on which the object is constructed;
   a coater that applies a layer of the building material to the support or to one of the respective layers of building material that was previously at least selectively solidified;
   at least one energy source that generates at least two energy beams;
   at least two scanning apparatuses that scan locations, corresponding to the cross section of the object to be produced, of the applied layer of the building material with the at least two energy beams for selectively solidifying the building material; and
   a control unit that controls operation of the apparatus, wherein the control unit controls the apparatus for carrying out a method for calibrating the apparatus for layerwise production of the three-dimensional object by layerwise solidification of the building material at the locations corresponding to the cross section of the object to be produced in the respective layers by the at least two energy beams, the method including the steps of:
      positioning a calibration device in the apparatus in such a way that a surface of the sensor is situated in an overlapping area of the at least two energy beams;
      iteratively deflecting a first energy beam, and determining a first actual position in which an output signal of the sensor reaches a maximum signal;
      iteratively deflecting a second energy beam, and determining a second actual position in which the output signal of the sensor reaches a maximum signal; and comparing the first and the second actual positions with one another and/or with corresponding desired positions, and determining at least one correction value from the comparison, wherein the calibration device includes a housing, and a sensor arranged in the housing, for receiving the at least two energy beams and outputting the output signal as a function of the intensity of the energy beams, the housing having at least two through-openings for transmitting the at least two energy beams, the through-openings being arranged so that central axes of the through-openings intersect on a surface of the sensor.

3. An apparatus for producing a three-dimensional object by layerwise solidification of building material at locations corresponding to cross sections of an object to be produced in successive respective layers by introducing solidifying energy to the building material for formation of each layer, comprising:
a movable support on which the object is constructed in a build area;
an apparatus that successively applies at least one of the layers of the building material to the support or thereafter over a previous layer that has been selectively solidified;
one or more energy sources that generate at least two energy beams that are each operated to provide the solidifying energy corresponding to at least one of the cross sections;
at least two scanning apparatuses that scan locations corresponding to at least one of the cross sections, a scanning apparatus directing a respective one of the at least two energy beams to selectively solidify the building material; and
a calibration device including:
a base that is removably positionable on the support or on a layer, and
a sensor arranged in the base, the sensor receiving at least a portion of the energy of each of the at least two energy beams and outputting an output signal as a function of the intensity of the received energy beams, each of the at least portion of the energy beams impinging the sensor from differing directions relative to a horizontal plane corresponding to the surface of the build area but intersecting on a surface of the sensor.

4. The apparatus of claim 3, wherein the base has two apertures formed therein each defined by a sidewall, the apertures passing at least a portion of a respective energy beam, the apertures being arranged so that respective central axes of the apertures intersect at the surface of the sensor.

5. The apparatus of claim 4, wherein the apertures are defined by conical shaped sidewalls having a widened diameter at a beam entry point and a smaller diameter at a beam exit point.

6. The apparatus of claim 3, wherein a first one of the energy beams impinges the sensor and then the other of the at least two energy beams impinges the sensor.

7. The apparatus of claim 3, further comprising:
iteratively deflecting a first energy beam, and determining a first actual position in which an output signal of the sensor reaches a maximum signal;
iteratively deflecting a second energy beam, and determining a second actual position in which the output signal of the sensor reaches a maximum signal; and
comparing the first and the second actual positions with one another and/or with corresponding desired positions, and determining at least one correction value from the comparison.

* * * * *

UNITED STATES PATENT AND TRADEMARK OFFICE
CERTIFICATE OF CORRECTION

PATENT NO. : 10,444,068 B2
APPLICATION NO. : 14/903660
DATED : October 15, 2019
INVENTOR(S) : Jochen Philippi Page 1 of 1

It is certified that error appears in the above-identified patent and that said Letters Patent is hereby corrected as shown below:

On the Title Page

Item (72), should read:
Inventor: Jochen Philippi, Gräfelfing, DE

Item (73), should read:
Assignee: EOS GMBH ELECTRO OPTICAL SYSTEMS, Krailling, OT (DE)

Signed and Sealed this
Seventh Day of January, 2020

Andrei Iancu
*Director of the United States Patent and Trademark Office*